United States Patent
Wang

(10) Patent No.: US 10,250,118 B1
(45) Date of Patent: Apr. 2, 2019

(54) PWM MODE BOOST SWITCHING REGULATOR WITH PROGRAMMABLE PULSE SKIP MODE

(71) Applicant: NXP B.V., Eindhoven (NL)

(72) Inventor: Ge Wang, Chandler, AZ (US)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 15/954,520

(22) Filed: Apr. 16, 2018

(51) Int. Cl.
*H02M 3/156* (2006.01)
*H02M 1/08* (2006.01)
*H02M 1/00* (2006.01)

(52) U.S. Cl.
CPC .......... *H02M 1/08* (2013.01); *H02M 3/156* (2013.01); *H02M 2001/0009* (2013.01); *H02M 2001/0032* (2013.01)

(58) Field of Classification Search
CPC .......... H02M 2001/0032; H02M 3/156; Y02B 70/16
See application file for complete search history.

(56) References Cited

U.S. PATENT DOCUMENTS

| | | | | |
|---|---|---|---|---|
| 6,385,061 B1* | 5/2002 | Turchi | ................ | H02M 1/34 323/902 |
| 9,791,883 B2* | 10/2017 | Wang | .................. | G05F 3/262 |
| 2004/0095111 A1* | 5/2004 | Kernahan | ........... | H02M 3/157 323/282 |
| 2007/0257647 A1* | 11/2007 | Chen | ................ | H02M 3/157 323/282 |
| 2008/0272747 A1* | 11/2008 | Melanson | ........... | H02M 1/4225 323/205 |
| 2013/0082618 A1* | 4/2013 | Hussain | ............... | G09G 3/3406 315/210 |
| 2017/0187289 A1* | 6/2017 | Fukumoto | ............... | H02M 1/08 |

OTHER PUBLICATIONS

Kapat, S. et al. "Voltage-Mode Digital Pulse Skipping Control of a DC-DC Converter With Stable Periodic Behavior and Improved Light-Load Efficiency", IEEE Transactions on Power Electronics, vol. 31, No. 4, pp. 3372-3379, Apr. 2016.

Luo, P. et al. "A high energy efficiency PSM/PWM dual-mode for DC-DC converter in portable applications", International Conference on Communications, Circuits and Systems, Milpitas, CA, pp. 702-706 (2009).

Angkititrakul, S. et al. "Design and analysis of buck converter with pulse-skipping modulation", IEEE Power Electronics Specialists Conference, Rhodes, pp. 1151-1156 (2008).

* cited by examiner

*Primary Examiner* — Harry R Behm

(57) ABSTRACT

A power supply is disclosed. The power supply includes a switch to regulate an input voltage and a current sense transistor to sense current through the switch. The power supply further includes a switching control to control a switching frequency of the switch. A programmable pulse skip circuit coupled to the switching control is also included. The switching control is configured to alter the switching frequency based on a pulse skip control signal received from the programmable pulse skip circuit. The programmable pulse skip circuit produces the pulse skip control signal based on an external control signal inputted to the programmable pulse skip circuit and the sensed current by the current sense transistor.

7 Claims, 1 Drawing Sheet

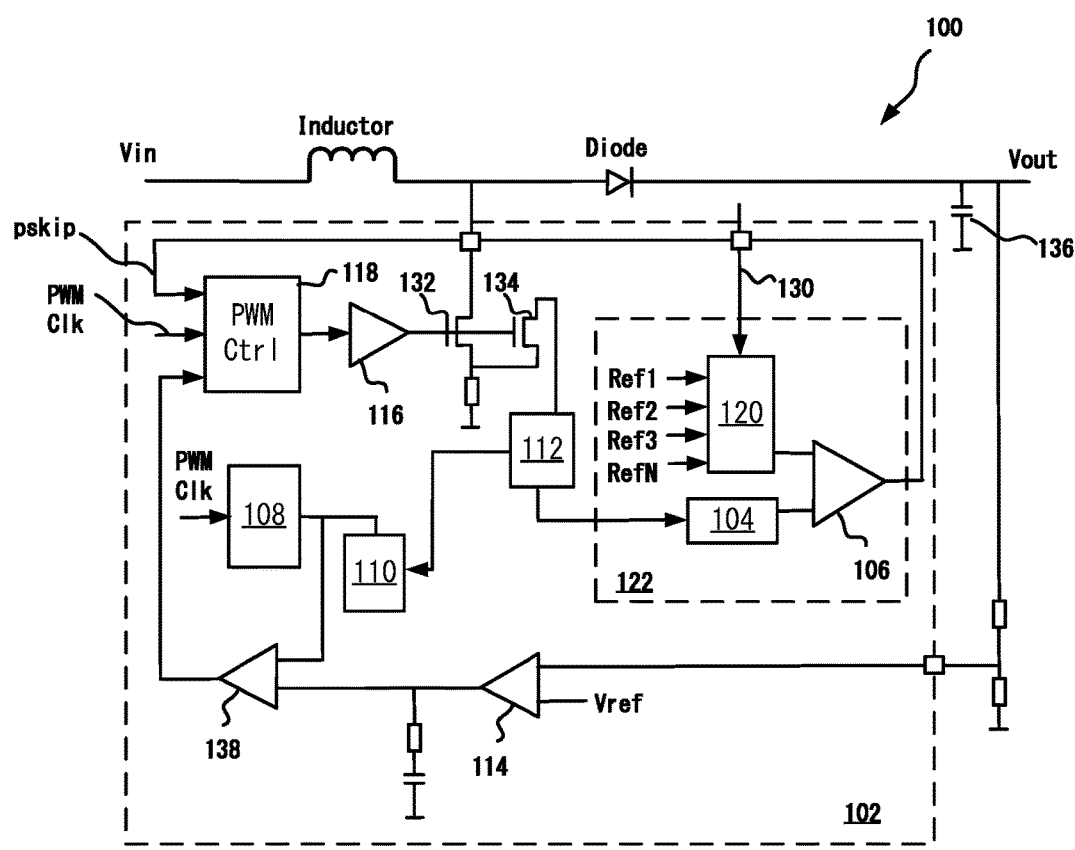

PWM MODE BOOST SWITCHING REGULATOR WITH PROGRAMMABLE PULSE SKIP MODE

BACKGROUND

Power supplies are used in every electronic device. There are several types of DC to DC power supplies including switching regulators and low drop-out regulator (LDO) used in different applications. A switching regulator uses an active device that switches on and off to maintain an average value of output.

A Pulse Width Modulation (PWM) mode switching power regulator uses a PWM clock to switch one or more switches to regulate input voltage to provide a constant output voltage.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, a power supply is disclosed. The power supply includes a switch to regulate an input voltage and a current sense transistor to sense current through the switch. The power supply further includes a switching control to control the switching of the switch. A programmable pulse skip circuit coupled to the switching control is also included to implement the programmable pulse skip mode. The switching control is configured to alter the switching frequency based on a pulse skip control signal received from the programmable pulse skip circuit. The programmable pulse skip circuit produces the pulse skip control signal based on an external control signal inputted to the programmable pulse skip circuit and the sensed current by the current sense transistor.

In some examples, the programmable pulse skip circuit includes a peak current value sampler coupled to the current sense transistor and holds a peak current value and a reference voltage selector to select one of a plurality of preselected fix reference voltages based on the external control signal. The programmable pulse skip circuit may also include a pulse skip comparator coupled to the peak current value sampler and the reference voltage selector. The pulse skip comparator generates the pulse skip control signal based on values inputted from the peak current value sampler and the reference voltage selector.

BRIEF DESCRIPTION OF THE DRAWINGS

To allow the above recited features of the present invention to be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments. Advantages of the subject matter claimed will become apparent to those skilled in the art upon reading this description in conjunction with the accompanying drawings, in which like reference numerals have been used to designate like elements, and in which:

FIG. 1 depicts a schematic diagram of a power supply with a programmable pulse skip mode module in accordance with one or more embodiments of the present disclosure.

Note that figures are not drawn to scale. Intermediate steps between figure transitions have been omitted so as not to obfuscate the disclosure. Those intermediate steps are known to a person skilled in the art.

DETAILED DESCRIPTION

Many well-known manufacturing steps, components, and connectors have been omitted or not described in details in the description so as not to obfuscate the present disclosure.

Typically, a fixed frequency pulse is used in pulse width modulation (PWM) mode regulators. When the output load current is below a selected threshold, the PWM mode regulators are configured to skip pulses to reduce the switching losses and to improve efficiency. Pulse skipping may be implemented using a pulse frequency modulation scheme in which the pulse frequency is reduced to another fixed value when the output load current is below the selected threshold. The selected threshold is a fixed value and this scheme may not be suitable for applications that may need different threshold values under different operating conditions. A programmable pulse skipping may provide better configurability and performance because pulse frequency may be changed according to different output load conditions.

FIG. 1 illustrates a switch mode power supply (SMPS) 100 that includes a controller chip 102. The SMPS 100 also includes an inductor, a diode, a capacitor and a resistor that may be outside of the controller chip 102. The controller chip 102 includes an oscillator (not shown) to generate pulse width modulation (PWM) clock (PWM Clk). The controller chip 102 includes a PWM controller 118 coupled to a driver 116 to drive a switching transistor 132 to regulate the input voltage Vin and produce stable output voltage Vout. The switching transistor may be a power NMOS switch in some examples. A sense transistor 134 is included to sense current through the switching transistor 132. A current sense circuit 112 is included to convert the sensed current to a voltage waveform. The sense current is also an indicative of the current passing through the inductor.

The current sense circuit 112 is coupled to a current summation block 110. The current summation block 110 is coupled to a slope compensation current generator 108. Typically, a switched-mode power supply (SMPS) employing peak current-mode control (PCMC) requires a ramp signal to slope-compensate the inner current control loop. Slope compensation stabilizes the current loop, which would otherwise exhibit subharmonic oscillation when operating in continuous conduction mode with a duty factor near or above 50%. Also, the current that should be controlled is the average value of the inductor current, which is directly related to load current since the output capacitor 136 should have zero average current. Slope compensation is typically implemented by summing a periodic ramp with the sensed current signal.

The output of the slope compensation current generator 108 is inputted to a PWM comparator 138. Another input the PWM comparator 138 is received from an error compensation block that includes an error amp 114, a resistor and a capacitor. The output of the PWM comparator 138 is provided to the PWM controller 118. The error amp 114 is coupled to Vout port and a reference voltage source (Vref).

The controller chip 102 further includes a programmable pulse skip mode block 122 that includes a peak current value sampler 104. The peak current value of the sensed current is held at the peak current value sampler 104. The programmable pulse skip mode block 122 includes a reference voltage selector 120. The reference voltage selector 120 includes a plurality of fixed reference voltage inputs Ref1, Ref2, Ref3 . . . RefN. Values of these reference voltage inputs may be configurable. For example, Ref1 may be 10 mV, Ref2 may be 20 mV and so on in some examples. Other values may be used by system designers depending on a type of application in which the power supply 100 is to be used. The reference voltage selector 120 includes a control port 130. A control signal from the control port 130 decides which reference voltage out of Ref1 to RefN is used. The control signal to the control port 130 is to be supplied from other parts of a system in which the power supply 100 is to be used. For example, the system designer may design a system in which a control circuit will generate the control signal for the control port 130 from outside the controller chip 102. In other words, the control signal may be generated based on specific system requirements for a system in which the power supply 100 is to be used. It should be noted that standard components of the power supply 100 are not being described in details so as not to obfuscate embodiments being described here. The standard components of the power supply (e.g., current summation, slope compensation, etc.) are well within the knowledge of a person skilled in the art.

The peak current value sampler 104 and the reference voltage selector 120 are coupled to a pulse skip comparator 106. Based on the control signal from the control port 130 and the peak value of the sensed current held at the peak current value sampler 104, the comparator 116 may generate a pulse skip signal. The pulse skip signal is inputted to the PWM controller 118 to control the switching frequency. The embodiments described here provides a fine granular control on the switching frequency depending on specific system requirements and load current. In some examples, if a system designer desire to have high efficiency at light load conditions the system designer may provide an appropriate control signal at the control port 130 to select a high reference voltage among Ref1 to Ref in order to enter pulse skip mode earlier. Pulse skip mode reduces the switching frequency which will reduce switching losses, thus increases power efficiency of the power supply 100.

In some embodiments, the control port 130 may be coupled to an I2C™ bus. The I2C™ bus is typically used to allow easy communication between components which reside on the same circuit board.

Some or all of these embodiments may be combined, some may be omitted altogether, and additional process steps can be added while still achieving the products described herein. Thus, the subject matter described herein can be embodied in many different variations, and all such variations are contemplated to be within the scope of what is claimed.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

Preferred embodiments are described herein, including the best mode known to the inventor for carrying out the claimed subject matter. Of course, variations of those preferred embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A power supply, comprising:
a switch configured to regulate an input voltage;
a current sense transistor configured to sense current through the switch;
a switching control configured to control a switching frequency of the switch; and
a programmable pulse skip circuit coupled to the switching control, wherein the switching control is configured to alter the switching frequency based on a pulse skip control signal received from the programmable pulse skip circuit, wherein the programmable pulse skip circuit produces the pulse skip control signal based on an external control signal inputted to the programmable pulse skip circuit and the sensed current by the current sense transistor and includes a reference voltage selector configured to select one of a plurality of preselected fixed reference voltages based on the external control signal.

2. The power supply of claim 1, wherein the programmable pulse skip circuit includes a peak current value sampler coupled to the current sense transistor and configured to hold a peak current value.

3. The power supply of claim 2, wherein the programmable pulse skip circuit includes a pulse skip comparator coupled to the peak current value sampler and the reference voltage selector.

4. The power supply of claim 3, wherein the pulse skip comparator is configured to generate the pulse skip control signal based on values inputted from the peak current value sampler and the reference voltage selector.

5. The power supply of claim 1 wherein values of the plurality of preselected fixed reference voltages are configurable.

6. The power supply of claim 1 wherein the reference voltage selector includes a control port.

7. The power supply of claim 6, wherein the control port is configured to select a single reference voltage of the plurality of preselected fixed reference voltages.

* * * * *